(12) United States Patent
Pribula et al.

(10) Patent No.: US 8,588,997 B2
(45) Date of Patent: Nov. 19, 2013

(54) DEVICES AND METHODS FOR CONTROLLING VEHICLE LIGHTS

(75) Inventors: David T. Pribula, Wake Forest, NC (US); Jonathan Mahtaban, Township of Washington, NJ (US)

(73) Assignee: Custom Dynamics LLC, Wake Forest, NC (US)

( * ) Notice: Subject to any disclaimer, the term of this patent is extended or adjusted under 35 U.S.C. 154(b) by 0 days.

(21) Appl. No.: 13/354,686

(22) Filed: Jan. 20, 2012

(65) Prior Publication Data

US 2013/0190972 A1    Jul. 25, 2013

(51) Int. Cl.
*B60Q 1/44* (2006.01)
*B60Q 1/46* (2006.01)
*B60Q 1/48* (2006.01)

(52) U.S. Cl.
USPC ........ 701/9; 701/46; 701/47; 701/48; 701/70; 701/71; 701/72; 701/78; 701/83; 340/426.32; 340/453; 340/457.3; 340/464; 340/479; 180/244; 180/275; 180/276; 180/325; 180/370

(58) Field of Classification Search
CPC ............ B60Q 2300/14; B60Q 2300/142; B60Q 1/44; B60Q 1/444; B60Q 1/52; B60Q 2400/20; B60Q 1/26; B60Q 1/2603
USPC .............. 701/9, 46–48, 70–72, 78, 83; 340/426.32, 453, 457.3, 464, 479, 608; 180/244, 275–276, 325, 370
See application file for complete search history.

(56) References Cited

U.S. PATENT DOCUMENTS

| | | |
|---|---|---|
| 3,688,258 A | 8/1972 | Frey |
| 4,403,210 A | 9/1983 | Sullivan |
| 5,001,398 A | 3/1991 | Dunn |
| 5,028,908 A | 7/1991 | Juang |
| 5,477,208 A | 12/1995 | Henderson et al. |
| 5,900,679 A | 5/1999 | Lake et al. |
| 6,031,452 A | 2/2000 | Trbovich |
| 6,371,637 B1 | 4/2002 | Atchinson et al. |
| 6,714,128 B2 | 3/2004 | Abbe et al. |
| 7,500,770 B2 | 3/2009 | Medina |
| 2005/0062597 A1* | 3/2005 | Su ................. 340/475 |
| 2006/0091817 A1* | 5/2006 | Herrig et al. ......... 315/200 A |
| 2006/0125615 A1* | 6/2006 | Song ............. 340/463 |
| 2006/0202812 A1* | 9/2006 | Satoh ............. 340/468 |
| 2007/0183152 A1* | 8/2007 | Hauck et al. ......... 362/251 |
| 2008/0100432 A1* | 5/2008 | Hoffman ......... 340/475 |
| 2009/0051523 A1* | 2/2009 | Perkins ......... 340/478 |
| 2009/0174540 A1* | 7/2009 | Smith ......... 340/465 |
| 2009/0189756 A1* | 7/2009 | Wu et al. ......... 340/475 |
| 2009/0322508 A1* | 12/2009 | Malik ......... 340/471 |
| 2010/0102946 A1* | 4/2010 | Polak et al. ......... 340/467 |
| 2010/0171145 A1* | 7/2010 | Morgan et al. ......... 257/99 |
| 2010/0327747 A1* | 12/2010 | Harris ............. 315/77 |
| 2011/0291476 A1 | 12/2011 | Pribula et al. |

* cited by examiner

*Primary Examiner* — Mary Cheung
*Assistant Examiner* — Atul Trivedi
(74) *Attorney, Agent, or Firm* — Coats & Bennett, P.L.L.C.

(57) ABSTRACT

A control circuit for operating the lights of a vehicle. In one embodiment, the rear lights of the vehicle are controlled by the control circuit. The control circuit illuminates two or more of the vehicle lights in a common pattern to indicate a specific vehicle operation. When the vehicle simultaneously performs two operations, the controller may transition the lights to illuminate in different patterns to clearly indicate the separate vehicle operations. The controller may further provide for adjusting the light intensity of one or more of the lights. The lights may be adjusted to have a similar intensity to prevent confusion when the different lights are used in combination to indicate a vehicle operation.

21 Claims, 5 Drawing Sheets

DEVICES AND METHODS FOR CONTROLLING VEHICLE LIGHTS

BACKGROUND

The present application is directed to controlling lights on a vehicle, and more particularly, to controlling the lights on a vehicle in a manner to clearly indicate to a viewer the operation of the vehicle.

Motor vehicles use external lights to indicate operational aspects of the vehicles to other drivers and pedestrians. The external lights include rear lights to indicate to others that are behind the vehicle the various vehicle operations such as running, braking, and turning.

A typical set of rear lights includes a central light to indicate running and braking. The central light may be illuminated at a first intensity when the vehicle is in a run state. The central light may further be illuminated at an increased intensity during vehicle braking. The rear lights also include a pair of turn lights. A left turn light physically positioned to the left of the central light is illuminated in a flashing pattern to indicate a left-hand turn. A right turn light physically positioned to the right of the central light is illuminated in the flashing pattern to indicate a right-hand turn.

Controllers are available to increase the functionality of the vehicle lighting system. These controllers may convert the two rear turn lights to also be illuminated with the central light during vehicle braking and running. This results in three running and braking lights, instead of just the single central light. The increased number of lights to indicate vehicle running and braking is a major safety improvement. The controllers may also be configured to display specialty display patterns on the lights during specific vehicle operations. For example, the controllers may display a flashing or strobe pattern on each of the three lights when the vehicle is braking.

A drawback of existing controllers that use the three lights together as a unit is that the lights may be displayed in a confusing manner when the vehicle performs multiple operations. A viewer following the vehicle may be uncertain whether the vehicle is braking, turning, both, or neither.

Further, the three lights may be different. For example, one or more of the lights may include incandescent bulbs with the remaining lights including light-emitting diode (LED) bulbs. Even through each of the lights is controlled in a common manner, different types of light sources will illuminate at different intensities. This may cause the visual impression that different vehicle operations are occurring. Existing controllers may provide for using a combination of lights during a single vehicle operation, but do not provide for adjusting the intensities to give a common visual appearance.

Thus, there is a need for a lighting system that utilizes different lights to signal a vehicle operation. The different lights should be displayed in a manner that provides a clear indication to a viewer of the vehicle operation.

SUMMARY

The present application is directed to devices and methods of operating vehicle lights. One aspect is directed to a method of operating a run/brake light, first turn light, and second turn light of a vehicle. The method includes receiving a brake signal. Responsive to the brake signal, illuminating the run/brake light and the first and second turn lights to display a first pattern that extends across each of the lights. While still receiving the brake signal, receiving a first turn signal. Responsive to the first turn signal, changing the operation of the first turn light from displaying the first pattern to displaying a second pattern while the run/brake light continues to display the first pattern.

Another aspect is directed to a control circuit that operates first, second, and third vehicle lights. The control circuit includes an output stage including a plurality of switches to selectively operate the first, second, and third lights. A controller is configured to control the output stage to illuminate the first, second, and third lights. The controller is configured to: operate the plurality of switches to display a first pattern on the first, second, and third lights responsive to receiving a brake signal and a lack of a turn signal; and operate the plurality of switches to display the first pattern on the first light while displaying a second pattern on the second light, responsive to receiving a first turn signal while also receiving the brake signal.

Another aspect is directed to a method of operating a run/brake light, first turn light, and second turn light of a vehicle. The method includes configuring the run/brake light to be illuminated at a first intensity when the vehicle is in a run state with the first intensity being less than a full intensity. The method includes receiving an input adjusting an intensity level of the first and second turn lights in the run state, and thereafter, determining that the vehicle is in the run state and operating the run/brake light and the first and second turn lights and displaying a first pattern that extends across each of the lights, the intensity of the first run light and the second turn light being substantially the same as the first intensity.

Another aspect is directed to a control circuit to operate first, second, and third lights of a vehicle. The control circuit includes a controller configured to receive a brake signal, a turn signal, and one or more user inputs. The controller is configured to display a brake pattern on each of the first, second, and third lights in response to receiving the brake signal and, responsive to also receiving the turn signal, to display the brake pattern on the first light, and a second pattern on the second light. The controller is also configured to display a run pattern on each of the lights when the vehicle is in a run state with the first light at an intensity less than a full intensity and the second and third lights being substantially the same as the first light intensity.

Another aspect is directed to a control circuit that operates a run/brake light, a first turn light, and a second turn light of a vehicle. The control circuit includes a controller and a user interface with one or more input mechanisms to submit a first input to the controller to select one of a plurality of lighting patterns and a second input to adjust an intensity level of the first and second turn lights in a run state. An output stage includes a plurality of switches to selectively operate the run/brake light, the first turn light, and the second turn light. The controller is configured to receive the inputs from the user interface and control the output stage to illuminate the run/brake light, the first turn light, and the second turn light. The controller is also configured to: operate the plurality of switches to display a selected one of the plurality of lighting patterns on the run/brake, first turn light, and second turn light in response to receiving a brake signal and a lack of a turn signal; operate the plurality of switches to display the selected lighting pattern on the run/brake light while displaying a second pattern on the first turn light, responsive to receiving a first turn signal while also receiving the brake signal; and determine that the vehicle is in the run state and display a second pattern on each of the lights with the run/brake light being illuminated at a first intensity that is less than a full intensity and the intensity of the first and second turn lights being substantially the same as the first intensity, the intensity of the first and second turn lights being based on the second input.

The various aspects of the various embodiments may be used alone or in any combination, as is desired.

DETAILED DESCRIPTION

The present application is directed to a control circuit for operating the lights of a vehicle. In one embodiment, the rear lights of the vehicle are controlled by the control circuit. The control circuit illuminates two or more of the vehicle lights in a common pattern to indicate a specific vehicle operation. When the vehicle simultaneously performs two operations, the controller may transition the lights to illuminate in different patterns to clearly indicate the separate vehicle operations. The controller may further provide for adjusting the light intensity of one or more of the lights. The lights may be adjusted to have a similar intensity to prevent confusion when the different lights are used in combination to indicate a vehicle operation.

The controller may illuminate the rear lights of a vehicle that include a run/brake light, left turn light, and right turn light. The controller causes two or more of the lights to be illuminated together as a unit in a common illumination pattern to increase visibility of the vehicle and provide a clearer indication to a viewer of the vehicle operation. In one embodiment, the brake/run light and the two turn lights are illuminated in a common pattern during vehicle braking. When the vehicle simultaneously activates one of the turn signals, the controller maintains the pattern on the run/brake light, illuminates the corresponding turn light with a second pattern, and deactivates the other turn light. This display clearly indicates to a viewer that the vehicle, which was braking, is now also turning in a specific direction.

The controller may also provide for adjusting the light intensity of one or more of the vehicle lights. The common intensity across each of the lights in the shared pattern provides a clearer indication of the vehicle operation. Adjustment of the one or more lights may provide for each light to have a substantially similar intensity for the combined lights to give a single visual appearance. The intensities of the lights may be the same, or in proximity to achieve the single visual appearance. One embodiment includes adjusting the two turn lights to correspond to the run/brake light intensity when the vehicle is running.

Figure 1:
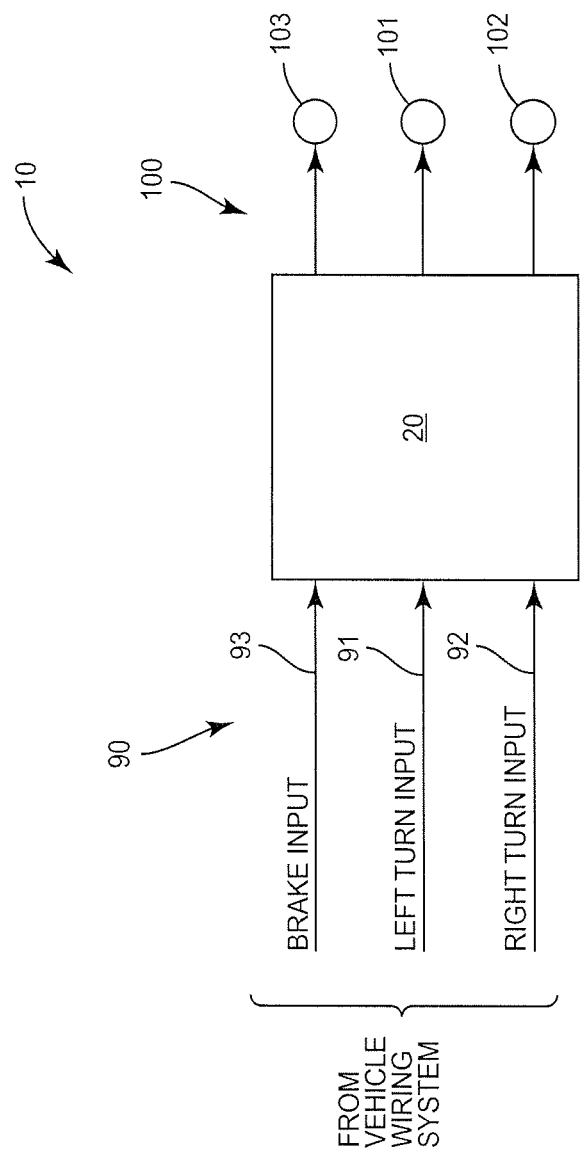
FIG. 1 is a schematic diagram of a controller, vehicle inputs, and vehicle lights.

FIG. 1 illustrates a schematic diagram of a control circuit 10 with a controller 20 that receives vehicle operation signals through inputs 90 from the vehicle wiring system. The inputs include a left turn input 91, right turn input 92, and a brake input 93. The various signals sent through the inputs 90 may be sent individually when the vehicle is performing a single operation (e.g., just braking), or may include multiple simultaneous signals (e.g., braking and turning).

The vehicle lights 100 are positioned on the exterior of the vehicle to indicate to others the operation of the vehicle. The lights 100 may include a left turn light 101, right turn light 102, and a run/brake light 103. Each of the lights 101, 102, 103 may include one or more bulbs, with some embodiments including lights with an array of bulbs. Further, the lights 100 may include incandescent bulbs or LED bulbs. In one embodiment, the run/brake light 103 comprises an array of 48 high powered, wide angle LEDs that provide more light output and illuminate faster than an incandescent bulb.

The controller 20 receives the one or more signals through the inputs 90 and is configured to process corresponding output signals to control the lights 100. The controller 20 causes the lights 100 to be displayed in various states. In one embodiment, the controller 20 is configured to operate the lights 100 in one of four separate states.

A first state includes no turn or brake signals received through the input 90. This lack of signals may occur when the vehicle is in use without the driver using either the brakes or turn signals. The controller 20 may display a pattern on just the run/brake light 103, or may use all three lights in combination and display the pattern across each of the lights 101, 102, 103. The combination of the lights 100 displaying a common pattern increases visibility of the vehicle operation to a viewer.

A second state includes the vehicle braking with the controller 20 receiving a signal through the brake input 93. In one embodiment, the controller 20 just displays a pattern on the run/brake light 103. In another embodiment, the controller 20 displays the pattern across each of the lights 100. Again, the use of the combination of lights 100 instead of just the run/brake light 103 increases the amount of illumination and provides a more robust signal to viewers of the vehicle braking. The user inputs determine which of the lights 100 display the brake light pattern.

The various lights in the second state are illuminated at a different intensity than the first state to differentiate the vehicle operations of running and braking. The second state normally includes the lights illuminated at a higher light intensity. In one embodiment, the second state includes each of the lights displayed at full intensity, with the first state including the lights displayed at a lower intensity.

A third state includes the vehicle simultaneously braking and turning with signals received by the controller 20 through the brake input 93 and one of the turn inputs 91, 92. The controller 20 maintains the selected braking pattern on just the run/brake light 103. Controller 20 also displays a flashing pattern on the appropriate turn light (either light 101 or 102). In one embodiment, the turn light 101 or 102 flashes in an on-and-off pattern at a rate controlled by the vehicle's flasher relay. In this third state, the controller 20 deactivates the opposing turn light pattern 101 or 102 that is away from the direction of the turn and maintains that light at a full brightness state for the duration of the blinker engagement period. In one or more embodiments the flashing pattern displayed on the appropriate turn light may be predefined to fall within a range that is permissible under traffic safety regulations of a given region, and this predefined pattern may be hardcoded to ensure compliance with such regulations, and to prevent user tampering.

A fourth state includes the vehicle turning without braking. In this operation, the controller 20 receives a signal through one of the turn inputs 91, 92 without receiving a braking signal. The controller 20 maintains a run pattern at the lower run intensity on the run/brake light 103 and displays the flashing pattern on the appropriate turn light 101, 102. The controller 20 maintains the run state brightness on the opposing turn light 101 or 102.

The various lighting states occur during the corresponding vehicle operation. The various lighting patterns are displayed on the corresponding lights 100 until a change in vehicle operation. For example, the run/brake light 103 may remain illuminated with a braking pattern until the operator stops braking the vehicle.

A variety of different illumination patterns may be displayed on the lights 100 during the various vehicle operations. Patterns may include but are not limited to solid designs (i.e., non-flashing), flashing designs, strobe designs that pulsate at a high frequency greater than the flashing displays, and a variety of specialty shape designs. The patterns may further include combinations of designs. Further, the patterns may be displayed a single time, or may be displayed in a repeating fashion. Specific embodiments may include: a pattern with four flashes then solid; a pattern with four flashes, solid for three seconds, repeat; a pattern with quad strobe, solid for one second, quad strobe, solid for three seconds, repeat; a pattern with a blaster X pattern for three seconds, repeat; a pattern with a constant blaster X pattern; a pattern with a constant fast strobe for five seconds, then solid; and a pattern with a constant fast strobe pattern. Various patterns are available from Custom Dynamics LLC of Raleigh, North Carolina (www.customdynamics.com). The control circuit 10 may include a variety of different patterns that may be selected by the user for display on the lights 100.

Figure 2:
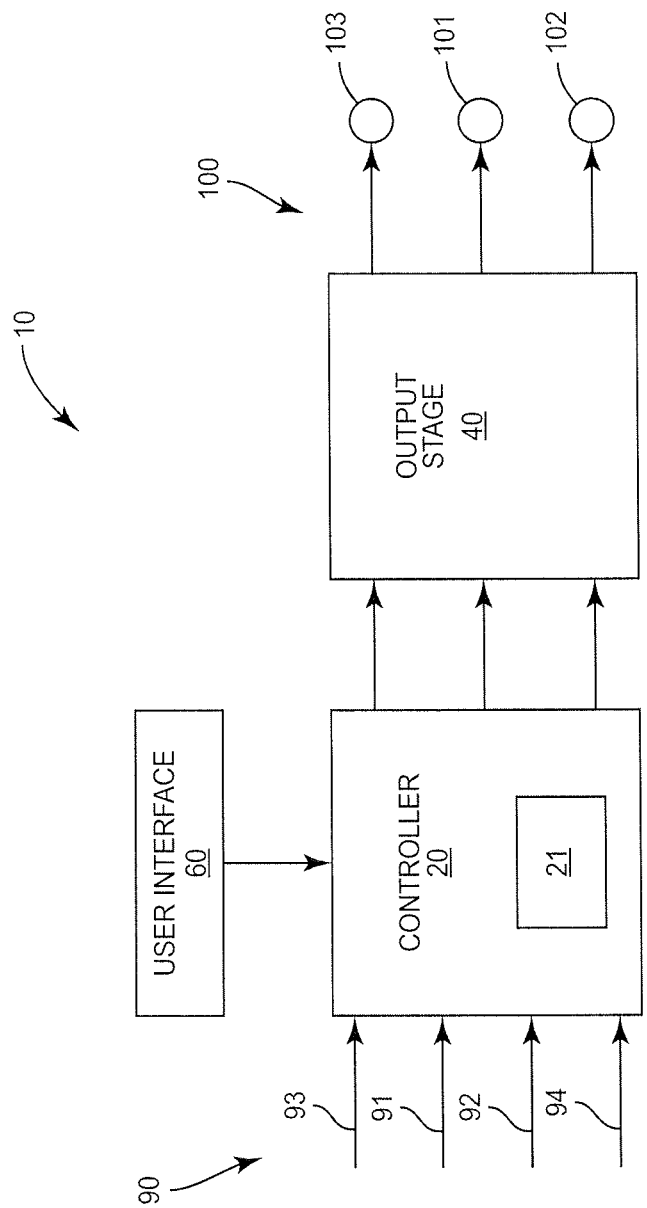
FIG. 2 is a schematic diagram of a control circuit that receives vehicle inputs and controls the display of the vehicle lights.

FIG. 2 includes a schematic diagram of a control circuit 10 positioned within the lighting system of a vehicle. The control circuit 10 has a controller 20 that may include one or more processors or microcontrollers, and may be configured to execute program code to control the various components and their functions. The controller 20 is configured to receive inputs from a user interface 60 and send corresponding signals that control the lights 100. This may include receiving inputs from the interface 60 to adjust the intensity of one or more of the lights 100, which the controller 20 may achieve through pulse width modulation.

The controller 20 further includes associated memory 21. Memory 21 may include one or several types of memory, including read-only memory, random-access memory, flash memory, magnetic or optical storage devices, or the like. FIG. 2 illustrates the memory 21 internally included with the controller 20. Other embodiments may have physically separate memories for one or more of the different components. One or more lighting patterns for operating the lights 100 are stored in the memory 21. The lighting patterns provide lighting patterns for illuminating the turn lights 101, 102 and/or the run/brake light 103 in the various states as explained above. The controller 20 receives input from the user interface 60 to illuminate the lights 100 using the various stored lighting patterns. Running light brightness for the turn signal outputs may also be stored in memory 21.

The user interface 60 is operatively connected to the controller 20. The user interface 60 includes inputs for the user to program the controller 20 to use the desired illumination patterns. The interface 60 may also provide for adjusting the light intensity of one or more of the lights 100 in the various lighting states. User interface 60 may further provide inputs to use the turn lights 101, 102 in combination with the run/brake light 103 for displaying a common illumination pattern.

An output stage 40 receives signals from the controller 40 and operates the lights 100. The output stage 40 may include one or more switches for operating the lights 101, 102, 103. The control circuit 10 may further include a power input 94 from the vehicle provides power to both the controller 20 and the lights 100 through the output stage 40.

Figure 3:
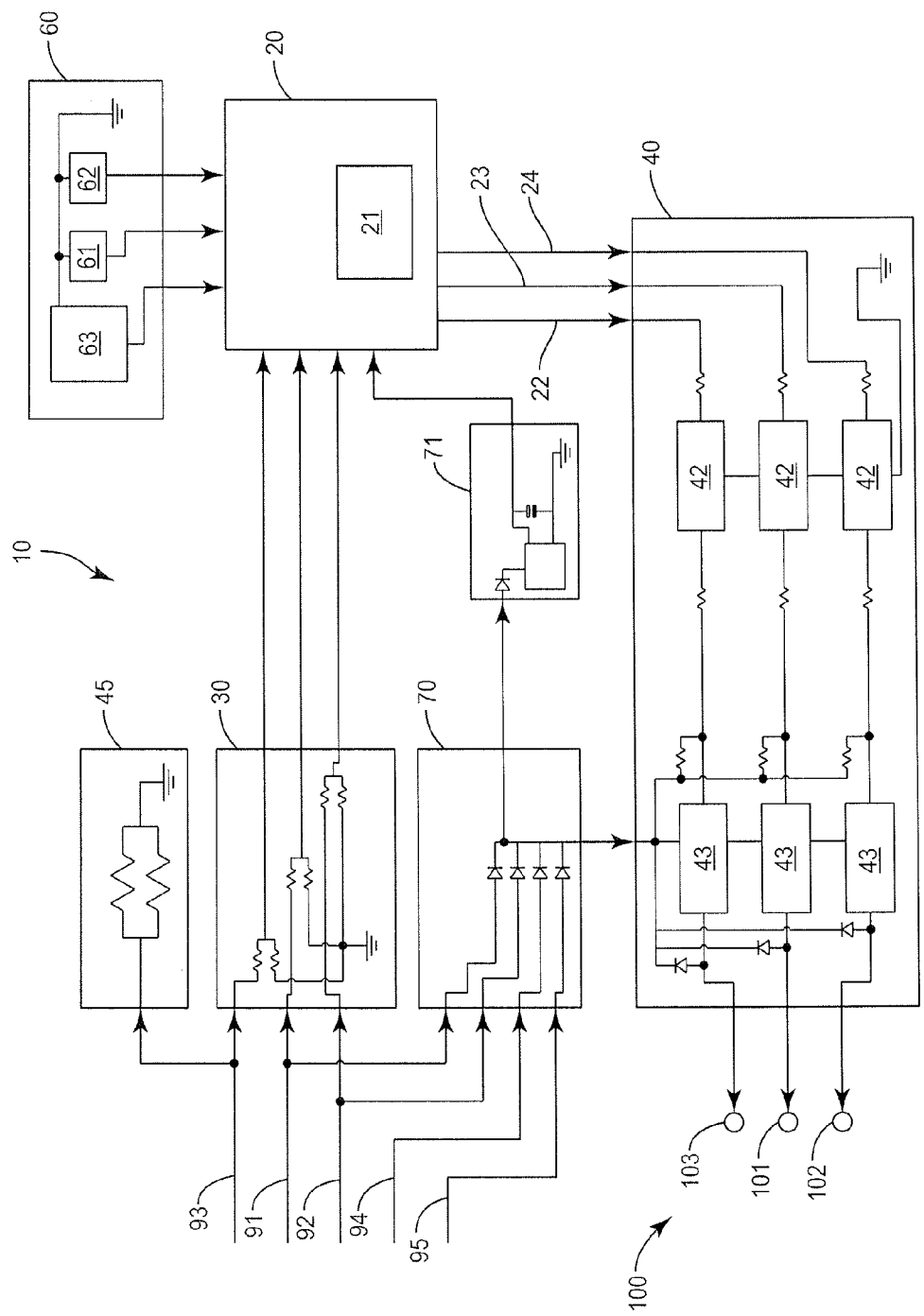
FIG. 3 is a schematic diagram of a control circuit that receives vehicle inputs and controls the display of the vehicle lights.

FIG. 3 illustrates a more detailed schematic diagram of a control circuit 10 for controlling the operation of the lights 100. An input stage 30 is positioned between the left turn input 91, right turn input 92, and brake input 93 and the controller 20. The input stage 30 functions as a voltage divider to provide proper voltage levels to the controller 20. In one embodiment, the input stage 30 provides a voltage step down from the battery voltage to a desired controller voltage. In one specific embodiment, the input stage 30 steps down the voltage from a 12 VDC battery source to a desired less than 5 VDC at the controller 20.

A power supply circuit 70 supplies a power source voltage to the controller 20 and the output stage 40 from multiple input sources. The power supply circuit 70 receives voltage inputs from the left turn input 91, right turn input 92, power input 94, and an auxiliary power input 95. Voltage is supplied from the power supply circuit 70 to the output stage 40 and to the microprocessor 20.

A second power supply circuit 71 may be connected between the power supply circuit 70 and the controller 20. The second power supply circuit 41 may automatically maintain a constant voltage level to the controller 20. In one embodiment, the second power supply circuit 71 maintains a constant 5 VDC voltage supply to the controller 20.

Some vehicles include a CAN-bus that provides for communication between vehicle components. In these vehicles, a power sink 45 is associated with the brake input 93. The power sink 45 provides a load on the brake input 93. Without the power sink 45, the vehicle may interpret the lack of load on the brake input 93 as an indication that the run/brake light 103 is missing or is not functioning properly. The power sink 45 provides a load to prevent this occurrence. In one embodiment, the power sink includes a pair of parallel 200 Ohm resistors.

Vehicles that include a CAN-bus may also require an auxiliary power input 95. During certain modes of vehicle operation, a large amount of power is drawn from the CAN-bus. In some circumstances, this large power draw would result in a fault condition which may cause a shutdown of the CAN-bus. To prevent this occurrence, the power supply circuit 70 also draws power from the auxiliary power input 95. This spreads the power draw and prevents an inadvertent fault condition.

As illustrated in FIG. 3, power is also supplied to the power supply circuit 70 through the left turn input 91 and the right turn input 92. This provides power when the power input 94 and the auxiliary power input 95 do not have power. This may occur when the vehicle is off. In certain circumstances power is still required to operate, such as the use of hazard lights that include the left turn light 101 and right turn light 102. For example, a vehicle operator may turn on the hazard lights, and then subsequently remove an ignition key which would prevent the power input 94 and auxiliary power input 95 from supplying power to the power supply circuit 70. In such a scenario, the necessary power for these circumstances is drawn through the two turn inputs 91, 92 (e.g. after the key has been removed from the ignition). The run/brake light 103 is not illuminated as part of the hazard lights and therefore the brake input 93 is not connected to the power supply circuit 70.

The user interface 60 provides inputs to the controller 20. The user interface 60 may provide for selecting whether the preset modulating patterns, or steady-on pattern is displayed on the run/brake light 103, on the turn lights 101, 102, or both. The user interface 60 may also be used for selecting a desired lighting pattern. The user interface 60 may also facilitate a pulse width modulation intensity selection for the run state to adjust the intensity levels of one or more of the lights 100.

The user interface 60 includes a number of switches 61, 62, 63 for entering the desired inputs. In one embodiment as illustrated in FIG. 3, the user interface 60 includes a pair of slide switches 61, 62 and a rotary switch 63. The user interface 60 may also include other configurations for the user to enter the desired information. Examples include but are not limited to a keypad, touch screen, etc. In one or more embodiments the positions of the rotary switch 63 correspond to available lighting patterns.

The output stage 40 receives signals from the controller 20 through outputs 22, 23, 24 to operate the lights. As illustrated in FIG. 3, the output stage 40 includes two sets of switches 42, 43. In one embodiment, the switches 42 include NPN bipolar transistors and switches 43 include MOSFET switches. Switches 42 may be included in the output stage 40 to switch the respective MOSFET switches 43 on and off as the controller 20 may not include the necessary drive on its own (e.g. a power output of the controller 20 may not be high enough to turn the MOSFET switches 43 on). The respective MOSFET switches 43 provide the power from the power supply circuit 40 to the lights 100.

In use, the control circuit 10 is incorporated into the vehicle wiring system. The control circuit 10 may be included as part of the original vehicle equipment. The control circuit 10 may also be configured to be included into the existing vehicle wiring system of a vehicle. In one embodiment, the control circuit 10 is configured in a wiring harness arrangement. The wiring harness may include one or more connectors that connect into the various inputs 90 and light outputs, such that a technician may install the control circuit 10 using existing connectors of a vehicle power system.

Figure 4:
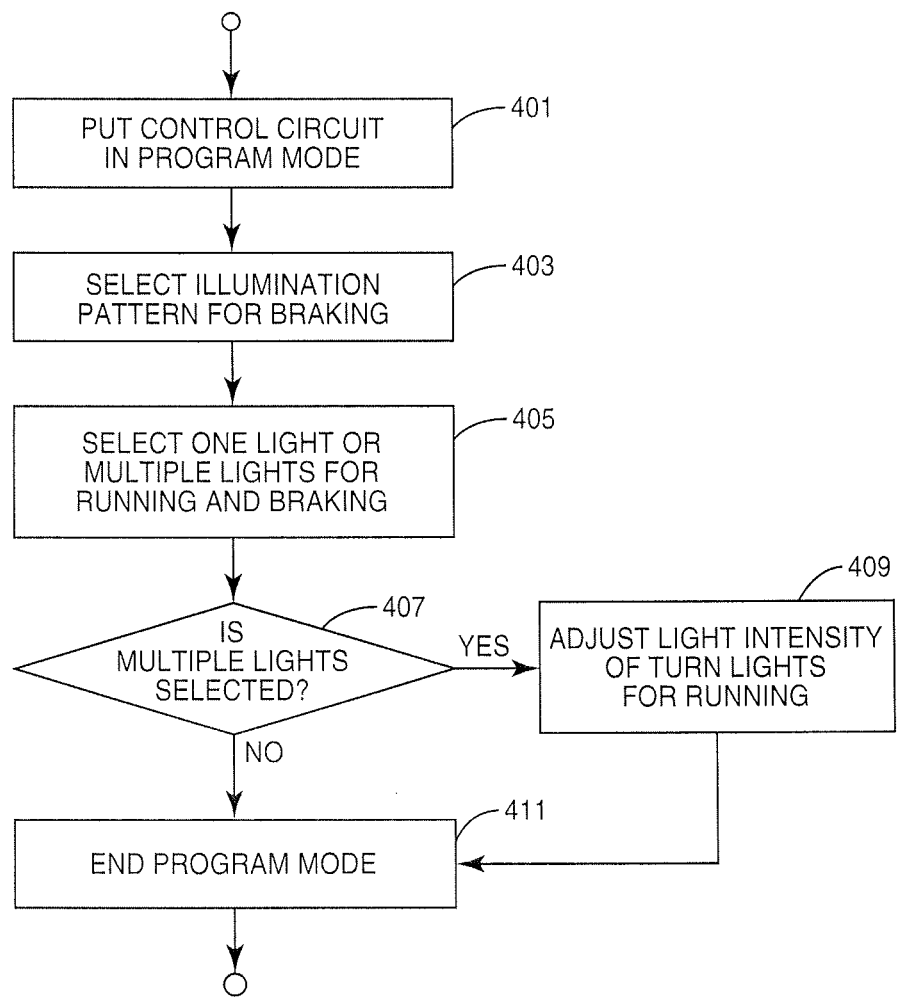
FIG. 4 is a flow chart diagram of a method of using a control circuit to control the display of lights on a vehicle.

FIG. 4 illustrates basic steps for programming the controller 20 through the user interface 60 to configure the illumination of the lights 100. The control circuit 10 is initially placed in a program mode (step 401). The controller 20 may be configured to allow entry into the programming mode only when the vehicle is not in operation.

Placing the control circuit 10 in the program mode may include the user entering one or more inputs through the user interface 60. The inputs may need to be entered in a predetermined manner. In one embodiment, the user provides two or more inputs through the switches 61, 62, 63 in a particular order (e.g., a first input is entered through switch 62 and a second input is entered through switch 61). An indication may be provided to the user that the control circuit 10 has been placed into the program mode. In one embodiment, the indication includes one or more of the lights 100 being illuminated in a particular manner.

Once the control circuit 10 is in the program mode, the user is able to program the desired settings for illumination of the lights 100. One setting includes selecting the desired illumination pattern to be displayed during vehicle braking (step 403). This includes various patterns described above. Another setting includes selecting whether the run and brake patterns are illuminated on just the center run/brake light 103, or over each of the three lights 101, 102, 103 (step 405).

If the pattern is illuminated over each of the three lights 101, 102, 103 (step 407), the user may need to adjust the light intensity of one or more of the lights 100 during the vehicle running state (step 409). This may be necessary because the different lights 101, 102, 103 include different bulbs, such as LED bulbs and incandescent bulbs.

In one embodiment, the run/brake light 103 includes one or more LED bulbs and the turn lights 101, 102 include one or more incandescent lights. During the vehicle running state, the controller 20 operates the bulbs at an intermediate voltage setting between a high intensity setting and a low intensity setting. This may result in incandescent bulbs appearing dim and the LED bulbs appearing bright. To compensate for the different appearances, the user may enter inputs to adjust the light intensity of the turn lights 101, 102. In one embodiment, the intensity adjustments are accomplished through pulse width modulation. In one embodiment, the adjustment is made through a multi-position rotary switch 63 on the user interface 60, with the multiple positions of the rotary switch 63 corresponding to light intensities. The user may adjust the settings accordingly to visually match the light intensities of the various lights 101, 102, 103. Although the actual light intensities may not be the same for each light 101, 102, 103, the intensities provide a common visual appearance across all three lights.

In one embodiment, the light intensity adjustment may be necessary for the vehicle running operation, but not for the braking or turning operations. During braking, a full voltage level is being applied to each of the lights 101, 102, 103. This full voltage causes the bulbs to be operated at a full intensity. This full intensity may cause each of the lights 100 to give a common appearance such that adjustment of any of the lights is not necessary. For turning, the turn lights 101, 102 flash between a full intensity and zero intensity and do not cause an issue. However, if the turning or braking illumination does cause a visual difference between lights, the user may be able to make adjustments through the user input 60.

In one embodiment, the two turn lights 101, 102 are adjusted in a common manner. The user input causes the same adjustment to be made to both lights. The user input may also be configured to adjust each of the lights 101, 102, 103 individually.

Returning to FIG. 4, the process continues with the user determining that the light intensities are properly adjusted. Once complete, the user ends the program mode (step 411). This may include entering one or more inputs through the user interface 60 similar to the process for entering the program mode. An indication may be provided to the user (e.g., lights flashing) to confirm to the user that the program mode has ended.

FIG. 4 includes the ability to select a variety of different light settings (i.e., illumination pattern, pattern displayed across just the run/brake light 101 or across all three lights 100, intensity adjustment). The control circuit 10 may also be configured to provide fewer than these options. Further, the user may not need to provide selections for each of the options.

In one embodiment, the user is not required to enter the program mode to adjust the brake pattern. Adjustments to the brake pattern may be made by operating one or more of the switches 61, 62, 63. Adjustments to the location of the brake pattern display may also be made by operating one or more of the switches 61, 62, 63. In one embodiment, the adjustments to the brake pattern are made through a rotary switch 63. In one embodiment, the adjustments to the location of the brake pattern display are made through slide switches 61, 62. The adjustments may be made at any time, regardless of whether the vehicle ignition is powered.

In one embodiment, the running light brightness may be adjusted by turning the vehicle ignition on with a rotary switch 63 at a first position (e.g., position 0). The rotary switch 63 is then rotated one revolution back to the first position. This action causes entry into the program mode to adjust the running light brightness. In this mode, further changes to the position of the rotary switch 63 correspond to different brightness settings for the lights 101, 102. In one specific embodiment, there are ten different brightness settings. The user selected intensity is permanently stored in non-volatile memory. In one embodiment, at any time during startup or while entering the program mode or in the program mode and an input is received (e.g., a turn input or a brake input), the unit will exit the program mode and resume normal operation.

Figure 5:
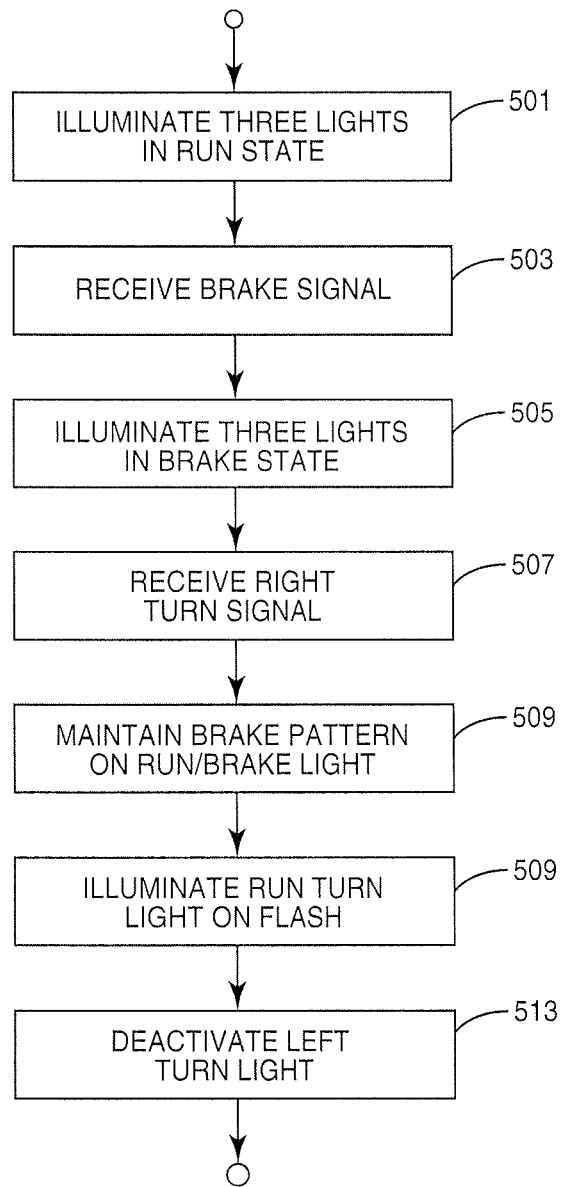
FIG. 5 is a flow chart diagram of a method of using a control circuit to control the display of lights on a vehicle.

FIG. 5 discloses a method of operating the lights 100 on a vehicle. In this embodiment, the user has selected that the three lights 101, 102, 103 are to be illuminated together in a common pattern during running and braking.

While the vehicle is running, the three lights 101, 102, 103 are illuminated in the run state (step 501). While in the run state, a brake signal is received through the brake input 93 (step 503). In response, the three lights 101, 102, 103 display the selected brake pattern (step 505).

While the lights 101, 102, 103 are illuminated in the brake pattern, a right turn signal is received through the right turn input 92 while still receiving the brake signal (step 507) (this embodiment uses receipt of a right turn signal, although the same process is performed for receipt of a left turn signal). The simultaneous vehicle operations results in the brake pattern continuing to be illuminated on the run/brake light 103 (step 509). Also, the illumination of the right turn light 102 changes to a flash pattern (step 511) controlled by the vehicle's flasher relay. In one embodiment, the flash pattern includes a flashing pattern of between 60-120 flashes per minute. Further, the left turn light 101 pattern is deactivated (step 513). This process of changing from a common pattern over the three lights 100, to separate illuminations over the three lights 100 clearly indicates the vehicle operation to a viewer.

In one embodiment, this process occurs when the common braking pattern over the three lights 100 is a strobe pattern. Other embodiments apply this process to other common braking patterns.

The control circuit 10 may be used in a variety of different vehicles. One embodiment provides for use with a motorcycle. However, these aspects may also be used in other vehicles that include brake and turn lights. Examples of other vehicles include but are not limited to cars, trucks, scooters, mopeds, construction equipment, tractors, etc.

The embodiments described above include illumination of the rear turn lights 101, 102 and run/brake light 103. The application may also be used to control the illumination of different and/or additional vehicle lights at various locations along the vehicle. Additional lights that may be controlled may include head lights, side running lights, license plate lights, and various other lights that may be original equipment or added to the vehicle.

In some embodiments, the run and brake light patterns may be illuminated across each of the three lights 101, 102, 103. There may be instances where the patterns are illuminated over just two of the lights 101, 102, 103. This setting may be input by the user through the user interface 60 when the control circuit 10 is in the program mode.

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

The present invention may be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of operating a run/brake light, first turn light, and second turn light of a vehicle, the method comprising:
receiving a brake signal;
responsive to the brake signal, illuminating the run/brake light and the first and second turn lights to display a first pattern that extends across each of the lights;
while still receiving the brake signal, receiving a first turn signal; and
responsive to the first turn signal, changing the operation of the first turn light from displaying the first pattern to displaying a second pattern while the run/brake light continues to display the first pattern and changing the third light to have a different visual appearance than each of the first and second lights.

2. The method of claim 1, further comprising responsive to the first turn signal, deactivating the first pattern on the second turn light while the first pattern is displayed on the run/brake light and the second pattern is displayed on the first turn light.

3. The method of claim 1, further comprising resuming illumination of the first and second turn lights to display the first pattern responsive to an absence of the first turn signal.

4. The method of claim 1, further comprising receiving a user input selecting the first pattern to be displayed upon receipt of the brake signal from a plurality of stored patterns.

5. A control circuit that operates first, second, and third vehicle lights, comprising:
an output stage including a plurality of switches to selectively operate the first, second, and third lights; and
a controller configured to control the output stage to illuminate the first, second, and third lights, the controller being configured to:
operate the plurality of switches to display a first pattern on the first, second, and third lights responsive to receiving a brake signal and a lack of a turn signal; and
operate the plurality of switches to display the first pattern on the first light while displaying a second pattern on the second light and a third pattern on the third light with each of the patterns being different, responsive to receiving a first turn signal while also receiving the brake signal.

6. The control circuit of claim 5, further comprising a user interface with one or more input mechanisms to select predefined lighting patterns, wherein the controller is operable to implement a selected lighting pattern as the first pattern.

7. The control circuit of claim 5, wherein the input mechanisms include a rotary switch with switch positions corresponding to available lighting patterns.

8. The control circuit of claim 6, wherein the user interface is further configured to program the controller to select a light intensity of the second and third lights when the vehicle is in a run state.

9. A method of operating a run/brake light, first turn light, and second turn light of a vehicle, comprising:

configuring the run/brake light to be illuminated at a first intensity when the vehicle is in a run state, the first intensity being less than a full intensity;

receiving an input adjusting an intensity level of the first and second turn lights in the run state, the input being received during a program mode when the vehicle is not in operation; and thereafter, determining that the vehicle is in the run state and operating the run/brake light and the first and second turn lights and displaying a first pattern that extends across each of the lights, the intensity of the first turn light and the second turn light being substantially the same as the first intensity.

10. The method of claim 9, further comprising configuring the run/brake light to be illuminated at the full intensity when the vehicle is in a braking state.

11. The method of claim 9, further comprising:
receiving a brake signal; and
displaying a second pattern across each of the run/brake light, the first turn light, and the second turn light with each of the lights being illuminated at the full intensity.

12. The method of claim 9, wherein operating the first and second turn lights at the selected intensity comprises performing pulse width modulation to a plurality of switches that connect the first and second turn lights to a vehicle power source.

13. A control circuit to operate first, second, and third lights of a vehicle, comprising:
a controller configured to receive a brake signal, a turn signal, and one or more user inputs;
the controller configured to display a brake pattern on each of the first, second, and third lights in response to receiving the brake signal and, responsive to also receiving the turn signal, to display the brake pattern on the first light, and a second pattern on the second light;
the controller also changing the third light to have a different visual appearance than each of the first and second lights responsive to the receiving the brake signal and the turn signal; and
the controller configured to display a run pattern on each of the lights when the vehicle is in a run state with the first light at an intensity less than a full intensity and the second and third lights being substantially the same as the first light intensity.

14. The control circuit of claim 13, further comprising a user interface with one or more input mechanisms operatively connected to the control circuit to input a first one of the user inputs for the controller to display the brake pattern on each of the lights, and input a second one of the user inputs for the controller to display the run pattern on each of the lights.

15. The control circuit of claim 13, further comprising an output stage that receives signals from the controller, the output stage including a plurality of switches to selectively operate the first, second, and third lights.

16. The control circuit of claim 13, wherein the controller is further configured to deactivate the third light responsive to receiving the brake signal and also receiving the turn signal.

17. The control circuit of claim 13, wherein the first light is a run/brake light, the second light is a left turn light, and the third light is a right turn light.

18. The control circuit of claim 13, wherein the controller is configured to display the brake pattern on each of the first, second, and third lights in response to receiving the brake signal and a lack of the turn signal.

19. A control circuit that operates a run/brake light, a first turn light, and a second turn light of a vehicle, comprising:
a controller;
a user interface with one or more input mechanisms to submit a first input to the controller to select one of a plurality of lighting patterns and a second input to adjust an intensity level of the first and second turn lights in a run state, the controller configured to receive the inputs when the vehicle is not in operation;
an output stage including a plurality of switches to selectively operate the run/brake light, the first turn light, and the second turn light; and
the controller operative to receive the inputs from the user interface and control the output stage to illuminate the run/brake light, the first turn light, and the second turn light, the controller being configured to:
operate the plurality of switches to display a selected one of the plurality of lighting patterns on the run/brake light, first turn light, and second turn light in response to receiving a brake signal and a lack of a turn signal;
operate the plurality of switches to display the selected lighting pattern on the run/brake light while displaying a second pattern on the first turn light and a third pattern on the second turn light, responsive to receiving a first turn signal while also receiving the brake signal, each of the patterns being different; and
determine that the vehicle is in the run state and display a second pattern on each of the lights with the run/brake light being illuminated at a first intensity that is less than a full intensity and the intensity of the first and second turn lights being substantially the same as the first intensity, the intensity of the first and second turn lights being based on the second input.

20. The control circuit of claim 19, wherein the controller further includes memory that includes the plurality of lighting patterns.

21. The control circuit of claim 19, further comprising an input stage that supplies a predetermined voltage to the controller from a vehicle power source.

* * * * *